United States Patent
Koo et al.

(10) Patent No.: US 8,391,254 B2
(45) Date of Patent: Mar. 5, 2013

(54) CHANNEL CONFIGURATION AND BANDWIDTH ALLOCATION IN MULTI-HOP CELLULAR COMMUNICATION NETWORKS

(75) Inventors: Changhoi Koo, Plano, TX (US); Purva R. Rajkotia, Iselin, NJ (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 820 days.

(21) Appl. No.: 11/465,944

(22) Filed: Aug. 21, 2006

(65) Prior Publication Data
US 2007/0081507 A1    Apr. 12, 2007

Related U.S. Application Data

(60) Provisional application No. 60/724,119, filed on Oct. 6, 2005, provisional application No. 60/724,019, filed on Oct. 6, 2005.

(51) Int. Cl.
*H04W 4/00* (2009.01)
(52) U.S. Cl. ............... 370/338; 455/11.1; 455/9; 455/7; 455/452.1; 455/509; 455/507; 370/315; 370/329
(58) Field of Classification Search ........................ None
See application file for complete search history.

(56) References Cited

U.S. PATENT DOCUMENTS

| | | | |
|---|---|---|---|
| 5,862,487 A | | 1/1999 | Fujii et al. |
| 5,883,884 A | * | 3/1999 | Atkinson ...................... 370/279 |
| 6,744,743 B2 | * | 6/2004 | Walton et al. ................. 370/318 |
| 6,771,661 B1 | * | 8/2004 | Chawla et al. ................. 370/468 |
| 7,400,856 B2 | * | 7/2008 | Sartori et al. ..................... 455/7 |
| 7,583,971 B2 | * | 9/2009 | Gorsuch et al. ............ 455/452.1 |
| 7,990,905 B2 | * | 8/2011 | Lappetelainen et al. ...... 370/315 |
| 2005/0048914 A1 | | 3/2005 | Sartori et al. |
| 2005/0141593 A1 | | 6/2005 | Pasanen et al. |
| 2008/0075178 A1 | * | 3/2008 | Lappetelainen et al. ...... 375/260 |
| 2008/0268855 A1 | * | 10/2008 | Hanuni et al. ................. 455/445 |
| 2010/0227620 A1 | * | 9/2010 | Naden et al. ................... 455/445 |

FOREIGN PATENT DOCUMENTS

| | | |
|---|---|---|
| EP | 0647074 | 4/1995 |
| EP | 1575326 | 9/2005 |
| KR | 20040073707 | 8/2004 |
| KR | 20060129807 | 12/2006 |
| WO | 0041543 | 7/2000 |
| WO | 2004032536 | 4/2004 |
| WO | 2005067173 | 7/2005 |

\* cited by examiner

*Primary Examiner* — Willie J Daniel, Jr.

(57) ABSTRACT

A multi-hop wireless communication network is disclosed, which includes a fixed communication unit, at least one mobile communication unit, and a relay communication unit. The relay communication unit is operable to relay a plurality of signals bi-directionally between the fixed communication unit and the at least one mobile communication unit, by receiving a first signal on at least one of a dedicated sub-carrier and a dynamic sub-carrier in a first downlink channel segment from the fixed communication unit, and transmitting the received first signal to the at least one mobile communication unit on a dynamic sub-carrier in a second downlink channel segment. Also, the relay communication unit is operable to receive a second signal on a dynamic sub-carrier in a first uplink channel segment from the at least one mobile communication unit, and transmit the received second signal to the fixed communication unit on at least one of a dedicated sub-carrier and a dynamic sub-carrier in a second uplink channel segment. Also, the fixed communication unit can allocate bandwidth dynamically or in a fixed amount in the first downlink channel segment, the relay communication unit can allocate bandwidth dynamically in the second downlink channel segment based on at least one Quality of Service value received from the at least one mobile communication unit, the relay communication unit can allocate bandwidth dynamically for the at least one mobile communication unit in the first uplink channel segment, and the fixed communication unit can allocate bandwidth dynamically or in a fixed amount for the relay communication unit in the second uplink channel segment.

20 Claims, 3 Drawing Sheets

CHANNEL CONFIGURATION AND BANDWIDTH ALLOCATION IN MULTI-HOP CELLULAR COMMUNICATION NETWORKS

CROSS-REFERENCE TO RELATED APPLICATIONS AND CLAIM FOR PRIORITY

The present application is related to U.S. Provisional Patent Application No. 60/724,119, entitled "CHANNEL CONFIGURATION FOR THE MULTIHOP CELLULAR NETWORKS," filed on Oct. 6, 2005, and U.S. Provisional Patent Application No. 60/724,019, entitled "EFFECTIVE BANDWIDTH ALLOCATION FOR THE MULTIHOP CELLULAR NETWORKS," also filed on Oct. 6, 2005, which are assigned to the assignee of the present application. The subject matter disclosed in U.S. Provisional Patent Application No. 60/724,119 and U.S. Provisional Patent Application No. 60/724,019 is incorporated by reference into the present application as if fully set forth herein. The present application hereby claims priority, under 35 U.S.C. §119(e), to U.S. Provisional Patent Application No. 60/724,119 and U.S. Provisional Patent Application No. 60/724,019.

FIELD OF THE INVENTION

The invention relates to the telecommunications field, and more particularly, but not exclusively, to a system and method for channel configuration and bandwidth allocation in multi-hop cellular communication networks.

BACKGROUND OF THE INVENTION

In conventional cellular communication networks, a fixed base station (BS) is responsible for controlling communications with the mobile stations (MSs) within the coverage area of that BS. The BS maintains control by selecting channels and communicating directly with the MSs. Thus, conventional cellular communication networks are considered single hop networks.

The limitations of single hop cellular networks are known. For example, the coverage of single hop cellular networks is limited by radio "dead spots" caused by interference from structures (e.g., buildings, etc.) located in the paths of the radiated signals. Also, the coverage of these networks is limited by the transmit power of the MSs. Significant increases in MS transmit power in single hop cellular networks increases signal interference, which decreases network capacity and throughput as a result.

Another limitation of single hop cellular networks is that their channel configurations are fixed. In order to maintain centralized control in single hop cellular networks, the BS selects the channels for communications with the MSs. The channel configuration designs in single hop cellular networks take these centralized control and channel selection features into account. Consequently, the channel configurations of conventional single hop cellular networks are not scalable.

In order to resolve these and other problems encountered with conventional signal hop cellular networks, standards that support multi-hop cellular communications have been approved. For example, IEEE Standard 802.16-2004 (formerly known as IEEE Standard 802.16d) for local and metropolitan area networks specifies the air interface for fixed broadband wireless access (BWA) systems supporting multimedia services. The medium access control (MAC) layer specified in Standard 802.16-2004 supports the use of point-to-multipoint architectures and mesh topologies. Using a mesh topology, a source node in a mesh network can communicate with a destination node via one or more intermediate nodes, and network control is distributed or decentralized. Thus, in the context of a cellular network using a mesh topology, a BS in a multi-hop cellular network can communicate with an MS via one or more fixed or mobile (intermediate) relay stations.

The advantages of multi-hop cellular networks over single hop cellular networks are known. For example, in multi-hop cellular networks, a BS can communicate indirectly with an MS via an intermediate relay station. Consequently, by providing alternate propagation paths, the effects of radio "dead spots" in these networks can be reduced. Also, because intermediate mobile or fixed relay stations can be used in multi-hop cellular networks, the transmit power of the individual MSs in these networks can be reduced. As a result, signal interference in multi-hop cellular networks can be reduced, which increases network capacity and throughput.

Although standards and protocols have been approved that support the use of multi-hop cellular communication networks, a number of important technical problems need to be resolved before such networks can be implemented. For example, in order to implement a multi-hop cellular network successfully, suitable channel configuration and bandwidth allocation mechanisms have to be developed with distributed access and control network objectives in mind.

SUMMARY OF THE INVENTION

In one embodiment, the present invention provides a multi-hop wireless communication network, including a fixed communication unit, at least one mobile communication unit, and a relay communication unit. The relay communication unit is operable to relay a plurality of signals bi-directionally between the fixed communication unit and the at least one mobile communication unit, by receiving a first signal on at least one of a dedicated sub-carrier and a dynamic sub-carrier in a first downlink channel segment from the fixed communication unit, and transmitting the received first signal to the at least one mobile communication unit on a dynamic sub-carrier in a second downlink channel segment. Also, the relay communication unit is operable to receive a second signal on a dynamic sub-carrier in a first uplink channel segment from the at least one mobile communication unit, and transmit the received second signal to the fixed communication unit on at least one of a dedicated sub-carrier and a dynamic sub-carrier in a second uplink channel segment.

In a second embodiment, the present invention provides a method for relaying a plurality of signals bi-directionally between a fixed communication unit and at least one mobile communication unit in a multi-hop wireless communication network, by a relay unit receiving a first signal on at least one of a dedicated sub-carrier and a dynamic sub-carrier in a first downlink channel segment from the fixed communication unlit, the relay unit transmitting the received first signal to the at least one mobile communication unit on a dynamic sub-carrier in a second downlink channel segment, the relay unit receiving a second signal on a dynamic sub-carrier in a first uplink channel segment from the at least one mobile communication unit, and the relay unit transmitting the received second signal to the fixed communication unit on at least one of a dedicated sub-carrier and a dynamic sub-carrier in a second uplink channel segment.

In a third embodiment, the present invention provides a method for allocating bandwidth in a multi-hop cellular communication network including a base station, a relay station, and at least one mobile station, by determining an initial amount of bandwidth to be allocated for the relay station, allocating a plurality of sub-carriers for the relay station, determining if a request has been received to change the allocation of sub-carriers, if a request has been received to change the allocation of sub-carriers, determining if the relay station has requested an allocation of at least one sub-carrier, and if the relay station has requested an allocation of at least one sub-carrier, selecting the at least one sub-carrier for allocation, if a request has been received to change the allocation of sub-carriers, determining if a channel quality value associated with the at least one mobile station has been received, and if the channel quality value has been received, selecting a sub-carrier associated with the received channel quality value; and allocating a fixed amount of bandwidth to the relay station including the at least one sub-carrier or the sub-carrier associated with the received channel quality value.

In a fourth embodiment, the present invention provides a method for allocating bandwidth in a multi-hop cellular communication network including a base station, a relay station, and a plurality of mobile stations, by determining a total amount of bandwidth to be allocated for the relay station and the plurality of mobile stations, calculating an aggregated amount of bandwidth associated with the plurality of mobile stations, determining if the relay station has requested an amount of bandwidth, if the relay station has requested an amount of bandwidth, determining if the total amount of bandwidth is greater than or equal to a sum of the aggregated amount of bandwidth and the amount of bandwidth requested by the relay station, if the total amount of bandwidth is greater than or equal to the sun of the aggregated amount of bandwidth and the amount of bandwidth requested by the relay station, determining if a sub-carrier overlap exists between a first plurality of sub-carriers allocated for the plurality of mobile stations and a second plurality of sub-carriers allocated for the relay station, and adjusting the allocation of sub-carriers to resolve the sub-carrier overlap if the overlap exists, and allocating an amount of bandwidth for the relay station including a bandwidth amount for the resolved allocation of sub-carriers and the amount of bandwidth requested by the relay station.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
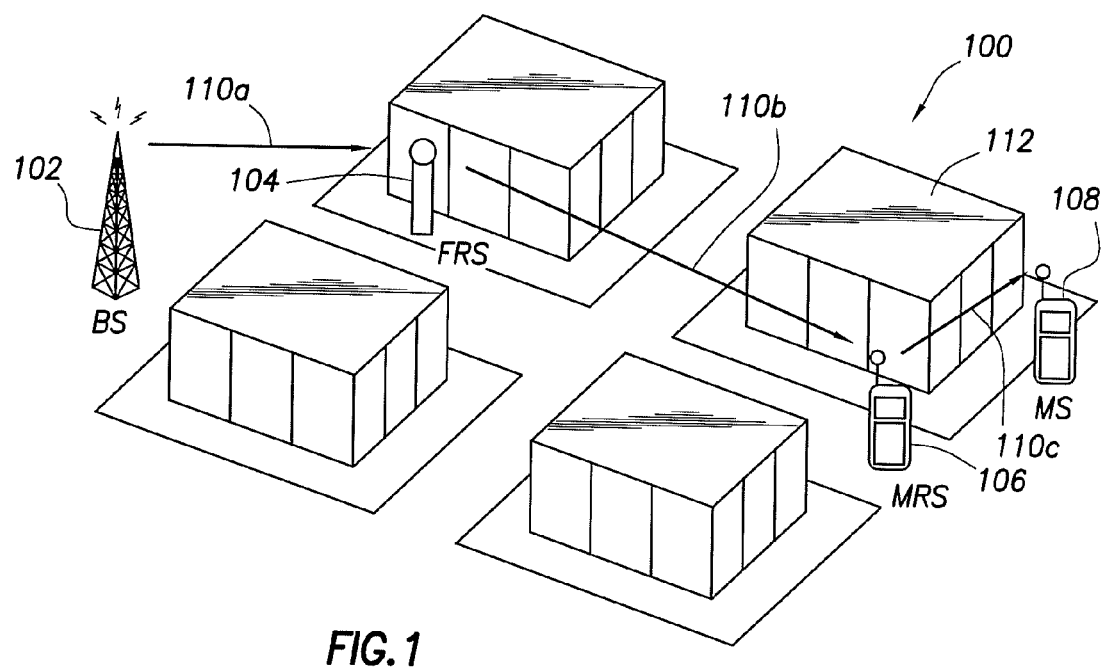
FIG. 1 is a simplified block diagram, which illustrates coverage in a multi-hop cellular network, in accordance with an example embodiment of the present invention.

With reference now to the figures, FIG. 1 is a simplified block diagram 100, which illustrates coverage in a multi-hop cellular network, in accordance with an example embodiment of the present invention. For this illustrative example, diagram 100 depicts a portion of a multi-hop cellular network, which includes a BS 102, a fixed relay station (FRS) 104, a mobile relay station (MRS) 106, and an MS 108. For example, the multi-hop cellular network depicted in FIG. 1 may be implemented in accordance with IEEE Standard 802.16-2004. BS 102 is shown communicating with MS 108 on a downlink via three link segments 110a through 110c (e.g., multiple links or multi-hops). For example, link segment 110a may be implemented with a wireline connection between BS 102 and FRS 104, and link segments 110b and 110c may be implemented as wireless connections between FRS 104 and MRS 106, and MRS 106 and MS 108, respectively. Note that the multi-hop, indirect routing of signals from BS 102 to MS 108 avoids a potential radio "dead spot" caused by the structure (e.g., building) 112 shown.

For illustrative purposes and clarity, only one BS and MS is depicted in the example network portion shown in FIG. 1. In practice, however, a complete multi-hop cellular network may include a plurality of BSs, and each BS may communicate with a plurality of MSs via a plurality of multi-hop downlinks and uplinks. Also, a fixed RS (FRS 104) and wireline link 110a to BS 102 are depicted in this illustrative example. However, in a different embodiment, a mobile or "nomadic" RS (NRS) and a wireless link to BS 102 may be used instead of FRS 104 and wireline link 110a. As such, the NRS may perform functionally similar to that of an FRS but in a mobile context. In yet another embodiment, an uplink or downlink path between a BS and an MS may include only an FRS (e.g., no MRS), only an MRS (e.g., no FRS), or multiple MRSs.

Figure 2:
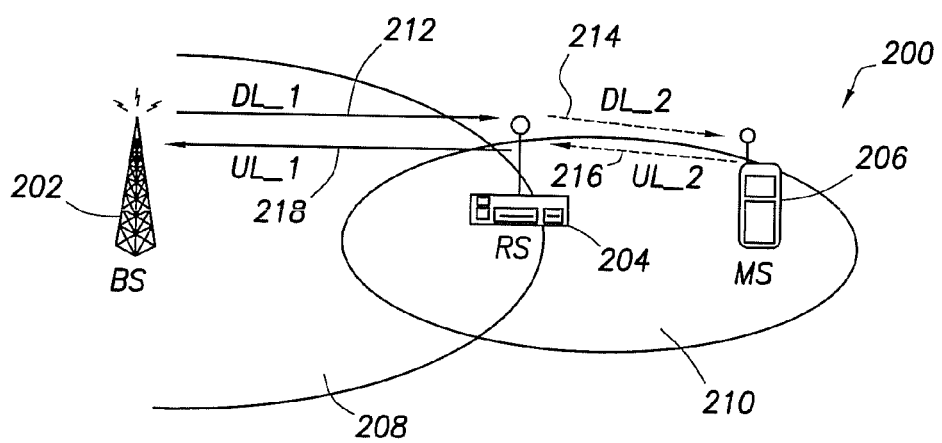
FIG. 2 depicts a block diagram of an example multi-hop cellular network configuration, which can be used to implement one embodiment of the present invention.

Essentially, channel configuration in multi-hop cellular networks, such as the multi-hop cellular network depicted in FIG. 1, can depend to a certain extent on the information being exchanged between the BSs and RSs involved. Also, downlink or uplink functions (including channel configuration) in multi-hop cellular networks can be determined in accordance with the particular network architecture involved. For example, FIG. 2 depicts a block diagram of an example multi-hop cellular network configuration 200, which can be used to implement one embodiment of the present invention. For this example, multi-hop cellular network configuration 200 depicted in FIG. 2 may be implemented in accordance with IEEE Standard 802.16-2004. In this example embodiment, a BS 202 is shown communicating with an RS 204, which is located within the coverage area 208 of BS 202. RS 204 may be a fixed RS or mobile RS. RS 204 is shown communicating with an MS 206, which is located within the coverage area 210 of RS 204 and outside the normal coverage area 208 of BS 202. Thus, as this illustrative example shows, the multi-hop cellular network configuration 200 extends the coverage area of BS 202. Notably, in this embodiment, assume that configuration 200 can support the use of both traffic channels and control channels.

In this example embodiment, BS 202 communicates on the downlink with RS 204 via a first downlink segment (path) 212. RS 204 communicates on the downlink with MS 206 via a second downlink segment 214. In this embodiment, RS 204 is enabled to support and re-transmit all of the channels being transmitted by BS 202. The bandwidth of downlink segment 212 between BS 202 and RS 204 can be a fixed bandwidth or dynamic bandwidth (e.g., dynamic in the sense that the size is determined by an aggregation of the bandwidth segments allocated during operations). Also, depending on the bandwidth allocation, the carriers used for channel allocation can be composed of dedicated or dynamic sub-carriers. For example, using Orthogonal Frequency Division Multiple Access (OFDMA) as a modulation scheme (e.g., in accordance with IEEE Standard 802.16-2004), an OFDMA carrier signal is composed of a plurality of sub-carriers. Each OFDMA user transmits symbols (including information) using one or more sub-carriers that are orthogonal to those of other users.

On the uplink, MS 206 communicates with RS 204 via a first uplink segment 216. RS 204 communicates with BS 202 via a second uplink segment 218. The uplink path (segment 218) between the RS and the BS is virtually identical to the downlink path (segment 212) between the RS and the BS. The primary functional difference between the uplink and downlink paths between BS 202 and RS 204 has to do with scheduling. For example, on the downlink, BS 202 allocates bandwidth to RS 204. However, on the uplink, scheduling of communications from RS 204 to BS 202 is performed in accordance with a suitable contention scheduling scheme.

In this example embodiment, downlink segment 214 between RS 204 and MS 206 is dynamic. For example, on the downlink, RS 204 controls the allocation of bandwidth to MS 206. The uplink path (segment 216) between the MS and the RS is virtually identical to the downlink path (segment 214) between the MS and the RS. Again, the primary functional difference between the uplink and downlink paths between RS 204 and MS 206 has to do with scheduling. On the uplink, scheduling of communications from MS 206 to RS 204 is performed in accordance with a suitable contention scheduling scheme.

The following table summarizes possible channel configuration alternatives for the example multi-hop cellular network configuration 200 shown in FIG. 2.

important to note that these restrictions are technical and/or architectural restrictions only and not limitations imposed on the scope of coverage of the present invention.

Figure 3:
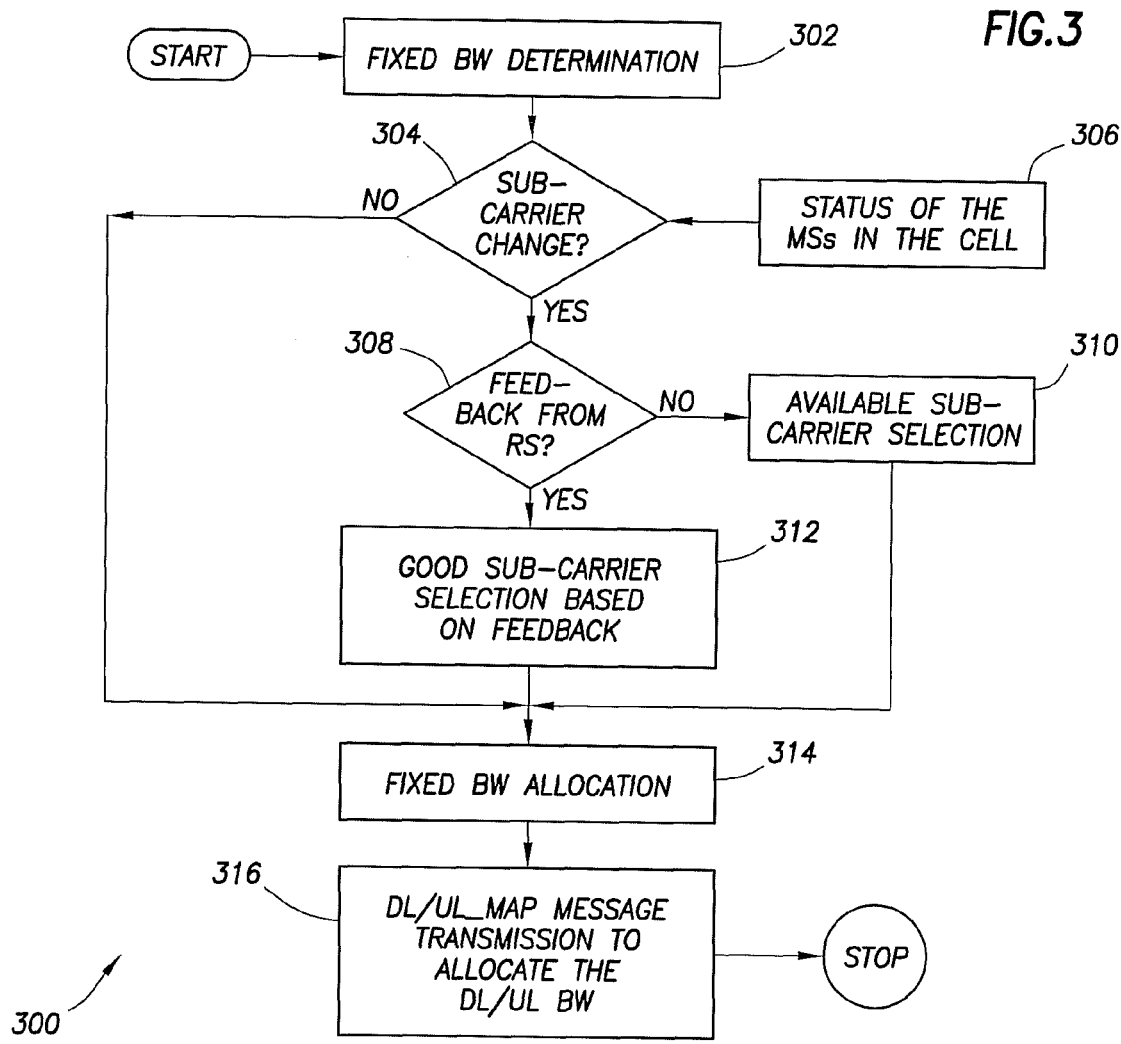
FIG. 3 depicts a flowchart of a method for allocating bandwidth in a multi-hop cellular communication system, which can be used to implement an example embodiment of the present invention.

FIG. 3 depicts a flowchart of a method 300 for allocating bandwidth in a multi-hop cellular communication system, which can be used to implement an example embodiment of the present invention. For example, method 300 can be used to implement the exemplary multi-hop cellular network configuration 200 depicted in FIG. 2. Referring to FIGS. 2 and 3 for this example embodiment, the BS (e.g., BS 202) calculates a suitable fixed bandwidth to be allocated for communication with the RS (e.g., 204) involved (step 302). For the example network configuration shown in FIG. 2, the BS preferably allocates the same fixed bandwidth to that RS regardless of the bandwidth requested by the RS. For example, a fixed bandwidth allocation for that RS can be negotiated with the RS and determined during the initial setup procedure (e.g., at boot-up).

Next, the BS determines what sub-carrier allocation to provide for the RS (step 304). For example, if the BS receives a request to change a sub-carrier allocation, the BS can change the sub-carriers to be allocated to the RS. Essentially, the RS is one of the terminals in the cell involved. Consequently, the BS can adjust a sub-carrier for the RS based on the status of the MS (e.g., 206) in that cell. For example, the BS can determine the MS's status based on suitable network feedback information, such as a channel quality report, etc. The BS checks the status of the MS's in the cell (step 306) and attempts to rearrange the sub-carrier used by the MSs in that cell. For example, the BS can prioritize the sub-carriers to be allocated to the MSs involved.

The BS then checks for feedback from the RS that is reporting channel or sub-carrier quality information (step 308). If the BS determines that no such feedback information has been received from that RS, the BS selects the sub-carriers for allocation based on those sub-carriers that have not been reported as preferred sub-carriers having higher

TABLE 1

Channel Configuration Alternatives for Network in FIG. 2

| Path | Direction | Channel Allocation | Bandwidth Allocation | Available Channel | Scheduling Scheme |
|---|---|---|---|---|---|
| DL_1 | BS to RS | Dedicated Sub-carriers Dynamic Sub-carriers | Fixed BW Dynamic BW with or without Limitation | Control or Traffic Channel | BS allocates particular BW to RS (MS not aware of BS allocation) |
| DL_2 | RS to MS | | Dynamic | Control or Traffic Channel | RS allocates BW to MS thru BW allocated from BS |
| UL_1 | RS to BS | Dedicated Sub-carrier | Fixed BW | Control or Traffic Channel | With or Without Contention |
| UL_2 | MS to RS | Dynamic | Dynamic BW | | |

Referring to Table 1 above, with respect to traffic channel usage via UL_2 (216) in multi-hop cellular network configuration 200 depicted in FIG. 2, communications between MS 206 and BS 202 are directed through RS 204. Thus, the following design restrictions should be imposed: (1) The MS (206) transmits the traffic channel and associated signaling information (e.g., bandwidth request ranging information) to the RS (204); and (2) The RS (204) re-transmits the traffic to the BS (202) on the bandwidth allocated from the BS. It is quality from the MSs in the cell involved (step 310). If the BS determines that such feedback has been received from that RS, the BS selects the sub-carriers based on sub-carrier information associated with high channel quality as a preferred sub-carrier, as reported, for example, in a feedback signal received from the RS (step 312).

Next, the BS allocates the fixed bandwidth to the RS based on the selected sub-carriers, while also considering the sub-carriers reported from the RS and/or the MSs in the cell (step 314). The BS then transmits an appropriate downlink/uplink message, which includes the fixed bandwidth allocation information (step 316). For example, in accordance with IEEE Standard 802.16-2004, the system involved can generate a suitable DL/UL_MAP message in order to allocate the downlink/uplink burst for the RS involved.

Figure 4:
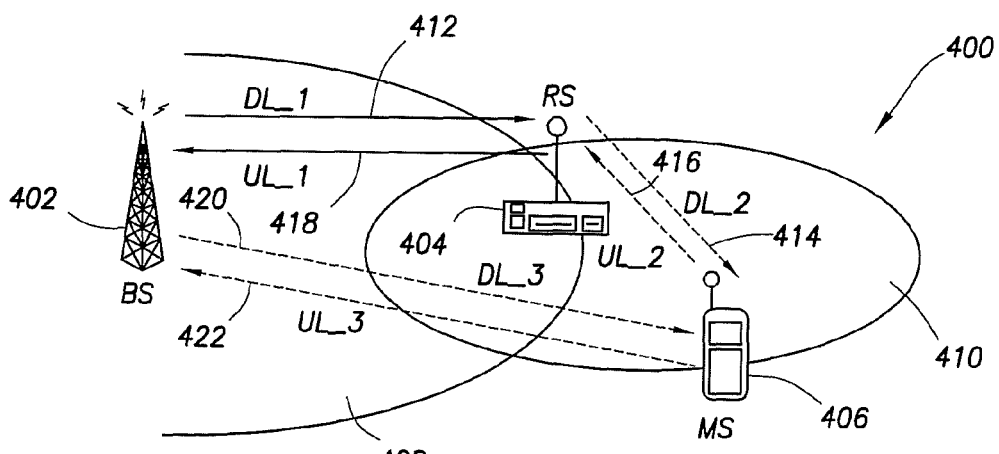
FIG. 4 depicts a block diagram of an example multi-hop cellular network configuration, which can be used to implement a second embodiment of the present invention.

FIG. 4 depicts a block diagram of an example multi-hop cellular network configuration 400, which can be used to implement a second embodiment of the present invention. For example, multi-hop cellular network configuration 400 depicted in FIG. 4 may be implemented in accordance with IEEE Standard 802.16-2004. In this example embodiment, a BS 402 is shown communicating with an RS 404, which is located within the coverage area 408 of BS 402. RS 404 may be a fixed RS or mobile RS. RS 404 is shown communicating with an MS 406, which is located within the coverage area 410 of RS 404 and outside the normal coverage area 408 of BS 402. Thus, as this illustrative example shows, the multi-hop cellular network configuration 400 extends the coverage area of BS 402.

In this example embodiment, BS 402 communicates on the downlink with RS 404 via a first downlink segment (path) 412. RS 404 communicates on the downlink with MS 406 via a second downlink segment 414. In this embodiment, RS 404 is enabled to support and re-transmit all of the channels being transmitted by BS 402. The bandwidth of downlink segment 412 between BS 402 and RS 404 can be a fixed bandwidth or dynamic bandwidth. For example, depending on the bandwidth allocation, the carriers used for channel allocation can be dedicated or dynamic sub-carriers. Notably, in this embodiment, assume that configuration 400 can support the use of both traffic channels and control channels.

On the uplink, MS 406 communicates with RS 404 via a first uplink segment 416. RS 404 communicates with BS 402 via a second uplink segment 418. The uplink path (segment 418) between the RS and the BS is virtually identical to the downlink path (segment 412) between the RS and the BS. The primary functional difference between the uplink and downlink paths between BS 402 and RS 404 has to do with scheduling. For example, on the downlink, BS 402 allocates bandwidth to RS 404. However, on the uplink, scheduling of communications from RS 404 to BS 402 is performed in accordance with a suitable contention scheduling scheme.

In this example embodiment, the downlink segment 414 between RS 404 and MS 406 is dynamic and used only for traffic information. For example, on the downlink, RS 404 controls the allocation of bandwidth to MS 406. The uplink path (segment 416) between the MS and the RS is virtually identical to the downlink path (segment 414) between the MS and the RS. Again, the primary functional difference between the uplink and downlink paths between RS 404 and MS 406 has to do with scheduling. On the uplink, scheduling of communications from MS 406 to RS 404 is performed in accordance with a suitable contention scheduling scheme.

For communications of overhead information in this example embodiment, BS 402 communicates directly with MS 406. For example, BS 402 communicates directly with MS 406 on a downlink path 420. MS 406 communicates directly with BS 402 on an uplink path 422. Downlink path 420 is used for signaling communications (e.g., control channels). BS 402 allocates bandwidth for these overhead communications with MS 406. Uplink path 422 is also used for signaling communications (e.g., control channels), and scheduling of communications from MS 406 to BS 402 is performed in accordance with a suitable contention scheme.

The following table summarizes possible channel configuration alternatives for the example multi-hop cellular network configuration 400 shown in FIG. 4.

TABLE 2

Channel Configuration Alternatives for Network in FIG. 4

| Path | Direction | Channel Allocation | Bandwidth Allocation | Available Channel | Scheduling Scheme |
|---|---|---|---|---|---|
| DL_1 | BS to RS | Dedicated Sub-carriers Dynamic Sub-carriers | Fixed BW Dynamic BW With or Without Limitation | Control or Traffic Channel | BS allocates particular BW to RS |
| DL_2 | RS to MS | | Dynamic | Traffic Channel | RS allocates BW for Traffic (only) to MS thru BW allocated from BS |
| DL_3 | BS to MS | | Dynamic | Control Channel (Network Entry) | BS allocates BW for Signaling (only) to MS |
| UL_1 | RS to BS | Dedicated Sub-carrier Dynamic | Fixed BW Dynamic BW | Control or Traffic Channel | With or Without Contention |
| UL_2 | MS to RS | | Dynamic | Traffic Channel | With or Without Contention |
| UL_3 | MS to BS | | Dynamic | Control Channel (Network Entry) | With or Without contention |

Referring to Table 2 above, with respect to control channel usage (via the DL_3 and UL_3 paths) in multi-hop cellular network configuration 400 depicted in FIG. 4, control channel communications are performed directly between the BS 402 and the MS 406. Thus, the following design restrictions should be imposed: (1) The MS (406) performs the network entry procedures in attempting to access the BS (402); (2) The BS (402) responds to the MS (406) and transmits information (e.g., ID, preamble, etc.) about the neighbor RS; and (3) After the MS (406) completes the network entry and authentication procedures, the MS (406) may communicate with the RS (404) if higher quality communications can be achieved.

With respect to traffic channel usage via the UL_2 path, the following design restrictions should be imposed: (1) Communications on the traffic channel can be accomplished with either the BS (402) and/or the RS (404); (2) The MS (406) transmits the traffic channel and associated signaling information (e.g., bandwidth request ranging information) to the RS (404); and (3) The RS (404) re-transmits the traffic to the BS (402) on the bandwidth allocated from the BS. It is important to note that the above-described restrictions are technical and/or architectural restrictions only and not limitations imposed on the scope of coverage of the present invention.

Figure 5:
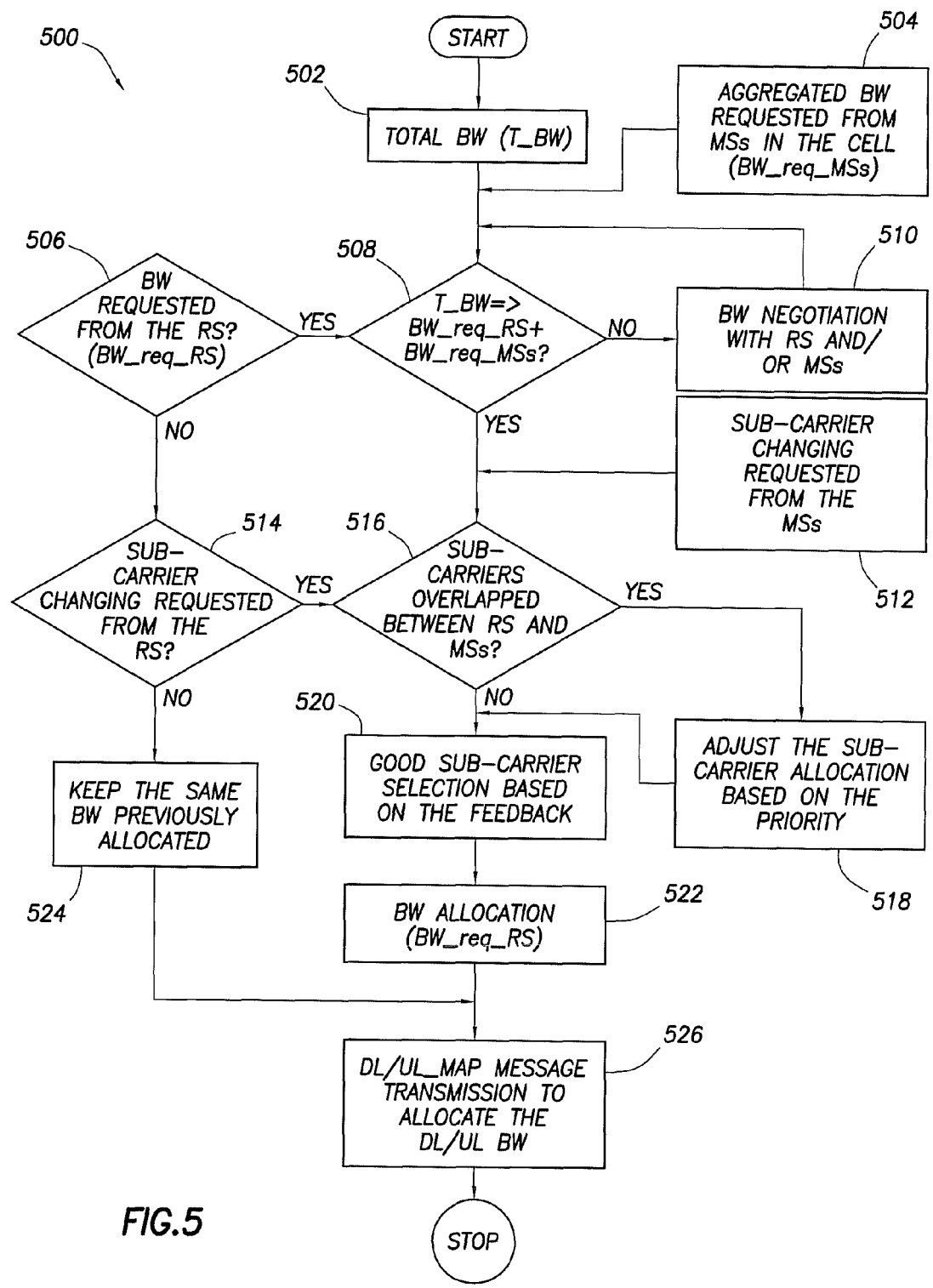
FIG. 5 depicts a flowchart of a method for allocating bandwidth in a multi-hop cellular communication system, which can be used to implement a second example embodiment of the present invention.

FIG. 5 depicts a flowchart of a method 500 for allocating bandwidth in a multi-hop cellular communication system, which can be used to implement a second example embodiment of the present invention. For example, method 500 can be used to implement the exemplary multi-hop cellular network configuration 400 depicted in FIG. 4. Referring to FIGS. 4 and 5 for this example embodiment, the BS (e.g., BS 402) determines the initial total bandwidth to be allocated for the RS (e.g., RS 404) and the MSs (e.g., MS 406) in the cell involved (step 502). For example, this initial value may be predetermined from the physical and MAC layer structure of the network. Next, the BS calculates the aggregated bandwidth requested by the MSs in that cell (step 504). The BS then determines if the RS has made a request for bandwidth (step 506). If the RS has made a request for bandwidth, the BS determines if the total initial bandwidth (from step 502) is greater than or equal to the sum of the bandwidth requested from the RS and the aggregated bandwidth requested by the MSs in that cell (step 508). If that sum is less the total initial bandwidth, then the BS negotiates the bandwidth to be allocated with the RS and/or the MSs in that cell (step 510).

Returning to step 508, if the BS determines that the sum of the bandwidth requested by the RS and aggregated bandwidth requested by the MSs in that cell is greater than or equal to the initial total bandwidth value, the BS checks to determine if a request for a sub-carrier to be allocated to the MSs in that cell (e.g., based on the sub-carriers measured and reported by the MSs in the cell) has been changed (step 512). Returning then to step 506, if the BS determines that no bandwidth request has been made by the RS, then the BS maintains the bandwidth allocated previously for the RS (e.g., obtained during the prior frame or prior bandwidth allocation period). The BS then determines if any requests for a sub-carrier change have been made by the RS (step 514). If the BS determines that the RS has made a request for a sub-carrier change, the BS determines if there is any overlap between any of the sub-carriers to be allocated for the RS and the MSs (step 516). If the BS determines that an overlap exists between one or more of the sub-carriers to be allocated for the RS and the MSs, then the BS adjusts the sub-carrier allocation in order to remove the sub-carrier overlap and allocate suitable sub-carriers without conflict for the RS and MSs involved (step 518). For example, the BS can adjust the allocation of sub-carriers for the RS and MSs based on the priority of the requests for the RS and MSs involved. If, however (at step 516), the BS determines that there is no overlap in the sub-carriers to be allocated for the RS and MSs involved, then the BS selects the higher quality level sub-carriers for allocation based on feedback reported or received from the RS (step 520). At this point, it may be assumed that no conflict exists in the sub-carrier allocations for the RS and MSs. The BS then allocates bandwidth to the RS based on the sub-carriers reported and bandwidth requested by the RS (step 522).

Returning to step 514, if the BS determines that the RS has not made any requests for a sub-carrier change, the BS maintains the bandwidth allocated previously (e.g., obtained during the prior frame or prior bandwidth allocation period) for the RS (step 524). The BS then transmits an appropriate downlink/uplink message, which includes the bandwidth allocation information (step 526). For example, in accordance with IEEE Standard 802.16-2004, the system involved can generate a suitable DL/UL_MAP message in order to allocate the downlink/uplink burst for the RS involved.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A multi-hop wireless communication network, the network comprising:
   a relay communication unit operable to relay a plurality of signals bi-directionally between a base station and at least one mobile communication unit; and
   the base station configured to send traffic information to the at least one mobile communication unit via the relay communication unit, to send overhead information directly to the at least one mobile communication unit, and to allocate bandwidth for sending the overhead information to the at least one mobile communication unit,
   wherein the relay communication unit is configured to allocate bandwidth for sending the traffic information to the at least one mobile communication unit and wherein to relay the plurality of signals, the relay communication unit is configured to:
      send to the base station a request to change an allocation of sub-carriers to the relay communication unit for a first downlink segment from the base station,
      receive a first signal on at least one of a dedicated sub-carrier and a dynamic sub-carrier in the first downlink channel segment from the base station, and
      transmit the received first signal to the at least one mobile communication unit on a dynamic sub-carrier in a second downlink channel segment,
   wherein a relay communication unit subcarrier allocation is based upon a reported channel quality of at least one of the relay communication unit and a mobile communication unit that directly communicates with the base station, and wherein the relay communication unit is a mobile relay communication unit.

2. The multi-hop wireless communication network of claim 1, wherein to relay the plurality of signals bi-directionally between the base station and the at least one mobile communication unit, the relay communication unit is further configured to:
   receive a second signal on a dynamic sub-carrier in a first uplink channel segment from the at least one mobile communication unit; and transmit the received second signal to the base station on at least one of a dedicated sub-carrier and a dynamic sub-carrier in a second uplink channel segment.

3. The multi-hop wireless communication network of claim 2, wherein the relay communication unit is further configured to receive and transmit the second signal using contention-based scheduling.

4. The multi-hop wireless communication network of claim 2, wherein the relay communication unit is further configured to allocate bandwidth dynamically for the at least one mobile communication unit in the first uplink channel segment, and the base station is further configured to allocate bandwidth dynamically or in a fixed amount for the relay communication unit in the second uplink channel segment.

5. The multi-hop wireless communication network of claim 1, wherein the base station is a base station in a cellular network, and the at least one mobile communication unit is a mobile station in the cellular network.

6. The multi-hop wireless communication network of claim 1, wherein the multi-hop wireless communication network comprises a multi-hop cellular network.

7. The multi-hop wireless communication network of claim 1, wherein the multi-hop wireless communication network comprises a cellular network.

8. The multi-hop wireless communication network of claim 1, wherein the mobile communication unit is configured to:
receive a first control signal on a dynamic sub-carrier in a third downlink channel segment from the base station; and
transmit a second control signal to the base station on a dynamic sub-carrier in a third uplink channel segment.

9. The multi-hop wireless communication network of claim 1, wherein the base station is configured to allocate bandwidth dynamically or in a fixed amount in the first downlink channel segment, and the relay communication unit is further configured to allocate bandwidth dynamically in the second downlink channel segment based on at least one Quality of Service value received from the at least one mobile communication unit.

10. A method of a relay unit for relaying a plurality of signals bi-directionally between a base station and at least one mobile communication unit in a multi-hop wireless communication network, the method comprising:
sending to the base station a request to change an allocation of sub-carriers to the relay communication unit for a first downlink channel segment from the base station;
receiving a first signal on at least one of a dedicated sub-carrier and a dynamic sub-carrier in the first downlink channel segment from the base station;
transmitting the received first signal to the at least one mobile communication unit on a dynamic sub-carrier in a second downlink channel segment;
receiving a second signal on a dynamic sub-carrier in a first uplink channel segment from the at least one mobile communication unit; and
transmitting the received second signal to the base station on at least one of a dedicated sub-carrier and a dynamic sub-carrier in a second uplink channel segment,
wherein a relay unit subcarrier allocation is based upon a reported channel quality of at least one of a mobile communication unit that directly communicates with the base station and the relay unit, wherein the relay unit is a mobile relay unit, wherein the base station is configured to send traffic information to the at least one mobile communication unit via the relay communication unit, to send overhead information directly to the at least one mobile communication unit, and to allocate bandwidth for sending the overhead information to the at least one mobile communication unit, and wherein the relay communication unit is configured to allocate bandwidth for sending the traffic information to the at least one mobile communication unit.

11. The method of claim 10, further comprising:
transmitting to the mobile communication unit a first control signal on a dynamic subcarrier in a third downlink channel segment from the base station;
transmitting a second control signal to the base station on a dynamic sub-carrier in a third uplink channel segment, wherein the bandwidth is allocated dynamically or in a fixed amount in the first downlink channel segment; and
allocating bandwidth dynamically in the second downlink channel segment based on at least one Quality of Service value received from the at least one mobile communication unit.

12. The method of claim 10, further comprising:
allocating bandwidth dynamically for the at least one mobile communication unit in the first uplink channel segment, wherein the bandwidth is allocated dynamically or in a fixed amount for the relay unit in the second uplink channel segment.

13. A method in a base station for allocating bandwidth in a multi-hop cellular communication network including the base station, a relay station, and at least one mobile station, the method comprising:
determining an initial amount of bandwidth to be allocated for the relay station;
allocating a plurality of sub-carriers for the relay station;
determining whether a sub-carrier change request has been received to change the allocation of sub-carriers from at least one of a mobile station and the relay station;
in response to determining that the sub-carrier change request has been received to change the allocation of sub-carriers, determining whether the relay station has requested an allocation of at least one sub-carrier;
in response to determining that the relay station has requested an allocation of at least one sub-carrier, selecting the at least one sub-carrier for allocation and determining whether the requested at least one sub-carrier overlaps with sub-carriers to be allocated to a mobile station;
in response to determining that the requested sub-carriers do not overlap with the sub-carriers to be allocated to a mobile station, re-allocating sub-carriers based on a priority of the requests; and
allocating a fixed amount of bandwidth to the relay station including the at least one sub-carrier or the sub-carrier associated with the received channel quality value,
wherein the relay station subcarrier allocation is allocated based upon sub-carrier change requests from at least one of a mobile station that directly communicates with the base station and the relay station, and the relay station is a mobile relay station that is configured to dynamically allocate downstream bandwidth to the at least one mobile station and use a contention scheduling scheme for upstream traffic from the at least one mobile station, wherein the base station is configured to send traffic information to the at least one mobile communication unit via the relay communication unit, to send overhead information directly to the at least one mobile communication unit, and to allocate bandwidth for sending the overhead information to the at least one mobile communication unit, and wherein the relay communication unit is configured to allocate bandwidth for sending the traffic information to the at least one mobile communication unit.

14. The method of claim 13, further comprising:
in response to determining that the request to change the allocation of sub-carriers has not been received, allocating a fixed amount of bandwidth to the relay station including the plurality of allocated sub-carriers.

15. The method of claim 13, wherein the channel quality value comprises a quality of service value.

16. The method of claim 13, further comprising:
transmitting a DL/UP_MAP message to allocate the fixed amount of bandwidth to the relay station.

17. A method in a base station for allocating bandwidth in a multi-hop cellular communication network including the base station, a relay station, and a plurality of mobile stations, the method comprising:
determining a total amount of bandwidth to be allocated for the relay station and the plurality of mobile stations;
calculating an aggregated amount of bandwidth requested by the plurality of mobile stations;
determining whether the relay station has requested an amount of bandwidth;
in response to determining that the relay station has requested an amount of bandwidth, determining whether the total amount of bandwidth is less than the aggregated amount of bandwidth and the amount of bandwidth requested by the relay station;
in response to determining that the total amount of bandwidth is not less than the sum of the aggregated amount of bandwidth and the amount of bandwidth requested by the relay station, determining whether a sub-carrier overlap exists between a first plurality of sub-carriers allocated for the plurality of mobile stations and a second plurality of sub-carriers allocated for the relay station;
adjusting the allocation of sub-carriers to resolve the sub-carrier overlap in response to determining that the overlap exists; and
allocating an amount of bandwidth for the relay station including a bandwidth amount for the resolved allocation of sub-carriers and the amount of bandwidth requested by the relay station,
wherein the relay station is a mobile relay station that is configured to dynamically allocate downstream bandwidth to the plurality of mobile stations and use a contention scheduling scheme for upstream traffic from the plurality of mobile stations, wherein the subcarrier allocation of the relay station is based upon the status of the at least one mobile station and the relay station, wherein the base station is configured to send traffic information to the at least one mobile communication unit via the relay communication unit, to send overhead information directly to the at least one mobile communication unit, and to allocate bandwidth for sending the overhead information to the at least one mobile communication unit, and wherein the relay communication unit is configured to allocate bandwidth for sending the traffic information to the at least one mobile communication unit.

18. The method of claim 17, wherein:
in response to determining that the relay station has not made a request for bandwidth, determining whether a sub-carrier change request has been received from at least one of the relay station and at least one of the plurality of mobile stations, and
in response to determining that a subcarrier change request has been received, determining whether the overlap exists, and adjusting the allocation of sub-carriers to resolve the overlap.

19. The method of claim 17, wherein:
in response to determining that the relay station has not made a request for bandwidth, determining whether a sub-carrier change request has been received from at least one of the relay station and at least one of the plurality of mobile stations, and
in response to determining that a subcarrier change request has not been received, maintaining the bandwidth allocation with a bandwidth value previously allocated.

20. The method of claim 17, further comprising transmitting a Downlink/Uplink MAP message to allocate the amount of bandwidth for the downlink and uplink segments of the network.

* * * * *